UNITED STATES PATENT OFFICE.

ALBRECHT THIELE, OF BERLIN, GERMANY, ASSIGNOR TO CHEMISCHE FABRIK AUF ACTIEN (VORM. E. SCHERING), OF BERLIN, GERMANY.

PHARMACEUTICAL COMPOUNDS.

1,082,780.     Specification of Letters Patent.     Patented Dec. 30, 1913.

No Drawing.     Application filed July 3, 1913. Serial No. 777,302.

*To all whom it may concern:*

Be it known that I, ALBRECHT THIELE, doctor of philosophy, chemist, citizen of the German Empire, residing at Berlin, Germany, have invented a new and useful Improvement in Pharmaceutical Compounds, of which the following is a specification.

The subject matter of my invention is the hitherto unknown esters of 2-piperonylquinolin-4-carboxylic acid and their derivatives. These compounds have proved to be valuable remedies, especially for treatment of gout, articular rheumatism, etc., an average dose being from ½ to 1 gram.

The new preparations are crystallizable compounds. They are soluble in organic solvents, insoluble in water.

The following are examples of methods of manufacture, the parts being by weight:

1. Dry gaseous hydrochloric acid is led into a suspension of 100 parts of 2-piperonylquinolin-4-carboxylic acid in 1000 to 1500 parts of ethyl alcohol at atmospheric temperature for some hours until solution and reprecipitation takes place. The ethyl ester when recrystallized out of 50 per cent. alcohol melts at 91 centigrade and is soluble in alcohol, ether and benzene but is insoluble in water and alkalis.

2. 100 parts of 2-piperonylquinolin-4-carboxylic acid are added to a mixture of 200 parts of absolute ethyl alcohol and 75 parts of concentrated sulfuric acid the solution being then boiled for twelve hours. The mixture is then poured into ice water and allowed to stand for some hours. The ethyl ester obtained is purified and recrystallized out of 50 per cent. alcohol.

3. 147 parts of 2-piperonylquinolin-4-carboxylic acid are heated in an autoclave provided with stirring mechanism with from 250 to 300 parts of water in which are dissolved 20 parts of caustic soda and 65 parts ethyl bromid (or the corresponding quantity of ethyl iodid or chlorid) for from three to four hours to 110 to 150 centigrades. After cooling the precipitated ethyl ester is treated with a dilute alkali solution and recrystallized from alcohol.

4. By replacing in the above examples the ethyl alcohol by methyl alcohol the corresponding methyl ester is obtained which recrystallized out of 50 per cent. alcohol melts at about 135 centigrades and possesses the same qualities as regards solubility.

The phenyl ester of 2-piperonylquinolin-4-carboxylic acid melts from 186 to 188 centigrades, when recrystallized from alcohol, the quinolyl ester decomposes at about 155 centigrades, the ortho-oxybenzoic acid ester melts at about 186 centigrades. In a similar manner the derivatives of 2-piperonylquinolin-4-carboxylic acid can be transformed into their esters. The methyl ester of the 6-methyl derivative recrystallized from methyl alcohol melts at 154 centigrades and is soluble in ether and benzene. The glycerin ester of the 6-methyl derivative forms with caustic soda or soda solution the sodium salt of the ester which precipitates in light shining leaves.

The methyl ester of 2-piperonylquinolin-4-carboxylic acid has the formula

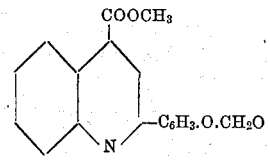

I claim as my invention:—

1. As new products the esters of a 2-piperonylquinolin-4-carboxylic acid compound, which products are crystallizable compounds, being soluble in organic solvents, insoluble in water, and being valuable remedies, substantially as described.

2. As a new product the methyl ester of 2-piperonylquinolin-4-carboxylic acid of the formula

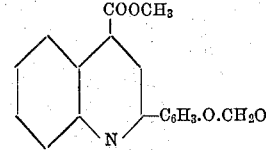

melting at about 135 centigrades, being soluble in alcohol, ether and benzene, insoluble in water, substantially as described.

In testimony whereof I have hereunto set my hand in the presence of two subscribing witnesses.

ALBRECHT THIELE.

Witnesses:
HENRY HASPER,
WOLDEMAR HAUPT.